(12) United States Patent
Knopf et al.

(10) Patent No.: US 11,490,071 B1
(45) Date of Patent: Nov. 1, 2022

(54) DEPTH AND VISION SENSORS FOR CHALLENGING AGRICULTURAL ENVIRONMENTS

(71) Applicant: APPHARVEST TECHNOLOGY, INC., Morehead, KY (US)

(72) Inventors: Ryan R. Knopf, Morehead, KY (US); Joshua Aaron Lessing, Morehead, KY (US); Michele Pratusevich, Morehead, KY (US); Jason A. Chrisos, Morehead, KY (US); Shreyas Aditya, Morehead, KY (US)

(73) Assignee: AppHarvest Technology, Inc., Morehead, KY (US)

( * ) Notice: Subject to any disclaimer, the term of this patent is extended or adjusted under 35 U.S.C. 154(b) by 0 days.

(21) Appl. No.: 17/430,766

(22) PCT Filed: Feb. 14, 2020

(86) PCT No.: PCT/US2020/018285
§ 371 (c)(1),
(2) Date: Aug. 13, 2021

(87) PCT Pub. No.: WO2020/168187
PCT Pub. Date: Aug. 20, 2020

Related U.S. Application Data

(60) Provisional application No. 62/820,986, filed on Mar. 20, 2019, provisional application No. 62/806,484, filed on Feb. 15, 2019.

(51) Int. Cl.
*H04N 13/271* (2018.01)
*G06T 7/593* (2017.01)
(Continued)

(52) U.S. Cl.
CPC .......... *H04N 13/271* (2018.05); *A01D 46/30* (2013.01); *G06T 7/593* (2017.01); *G06T 7/70* (2017.01);
(Continued)

(58) Field of Classification Search
None
See application file for complete search history.

(56) References Cited

U.S. PATENT DOCUMENTS

| | | | | |
|---|---|---|---|---|
| 2010/0322477 A1* | 12/2010 | Schmitt | ............ | H04N 5/23254 348/222.1 |
| 2016/0187199 A1* | 6/2016 | Brunk | .................... | G06V 20/66 348/89 |

(Continued)

FOREIGN PATENT DOCUMENTS

| | | | | |
|---|---|---|---|---|
| WO | WO-2014165692 A1 * | 10/2014 | ............ | A61M 21/00 |
| WO | 2018087546 | 5/2018 | | |

OTHER PUBLICATIONS

Li, D et al. "30 Imaging of Greenhouse Plants with an Inexpensive Binocular Stereo Vision 1-41 System"; Remote Sens. 2017, 9, 508; Publication [online]. May 21, 2017 [retrieved Apr. 3, 2020]. Retrieved from the Internet: <URL: https://www.mdpi.com/2072-4292/9/5/508>; <DOI: 10.3390/rs9050508> (Year: 2017).*

(Continued)

*Primary Examiner* — Adam D Tissot
*Assistant Examiner* — Garrett F Evans
(74) *Attorney, Agent, or Firm* — Benesch, Friedlander, Coplan & Aronoff, LLP

(57) ABSTRACT

Provided is a method for three-dimensional imaging a plant in an indoor agricultural environment having an ambient light power spectrum that differs from a power spectrum of natural outdoor light. The method comprises directing a spatially separated stereo pair of cameras at a scene includ- (Continued)

ing the plant, illuminating the scene with a non-uniform pattern provided by a light projector utilizing light in a frequency band having a lower than average ambient intensity in the indoor agricultural environment, filtering light entering image sensors of each of the cameras with filters which selectively pass light in the frequency band utilized by the light projector, capturing an image of the scene with each of the cameras to obtain first and second camera images, and generating a depth map including a depth value corresponding to each pixel in the first camera image.

41 Claims, 11 Drawing Sheets

(51) Int. Cl.
    *G06T 7/70*         (2017.01)
    *H04N 9/04*        (2006.01)
    *H04N 5/225*       (2006.01)
    *A01D 46/30*      (2006.01)
    *H04N 13/239*     (2018.01)

(52) U.S. Cl.
    CPC .......... *H04N 5/2256* (2013.01); *H04N 9/0455* (2018.08); *H04N 13/239* (2018.05); *G06T 2207/30188* (2013.01)

(56) References Cited

U.S. PATENT DOCUMENTS

2019/0303668 A1*  10/2019  King .................... B64C 39/024
2022/0000051 A1*   1/2022  Geltner ................... A01G 7/06
2022/0022384 A1*   1/2022  Yamada ................. A01G 7/045

OTHER PUBLICATIONS

Smith, L et al. "Innovative 30 and 20 machine vision methods for analysis of plants 1-41 and crops in the field"; Computers in Industry 97 (2018) 122-131; Publication [online]. Mar. 10, 2018 [retrieved Apr. 3, 2020). Retrieved from the Internet: <URL: https://doi.org/10.1016/j.compind.2018.02.002> (Year: 2018).*

Li, D et al. "30 Imaging of Greenhouse Plants with an Inexpensive Binocular Stereo Vision System"; Remote Sens. 2017, 9, 508; Publication [online]. May 21, 2017 [retrieved Apr. 3, 2020). Retrieved from the Internet: <URL: https://www.mdpi.com/2072-4292/9/5/508>.

Smith, L et al. "Innovative 3D and 2D machine vision methods for analysis of plants and crops in the field"; Computers in Industry 97 (2018) 122-131; Publication [online]. Mar. 10, 2018 [retrieved Apr. 3, 2020). Retrieved from the Internet: <URL: https://doi.org/10.1016/j.compind .2018.02.002>.

* cited by examiner

DEPTH AND VISION SENSORS FOR CHALLENGING AGRICULTURAL ENVIRONMENTS

TECHNICAL FIELD

Aspects and embodiments disclosed herein relate to machine imaging of agricultural products to determine a three-dimensional location of same.

BACKGROUND

To direct automated multi-degree-of-freedom systems (robotic systems) to interact with living plants for harvest, pruning, trellising, or various forms of analysis, high accuracy real time three-dimensional imaging of the plant is often employed as one of multiple sensor modalities in a complete automated system. In indoor agricultural environments, unique lighting conditions exist which would not be typical anywhere else. Additionally, the actual shape, irregularity, and surface color or texture of vine-grown and leafy crops present a uniquely challenging target for traditional three-dimensional (3D) imaging sensors. Existing and commercially available 3D imaging systems perform very poorly under these unique conditions.

SUMMARY

In accordance with an aspect disclosed herein, there is provided a method for three-dimensional imaging a plant in an indoor agricultural environment having an ambient light power spectrum that differs from a power spectrum of natural outdoor light. The method comprises directing a spatially separated stereo pair of cameras at a scene including the plant, illuminating the scene with a non-uniform pattern provided by a light projector utilizing light in a frequency band having a lower than average ambient intensity in the indoor agricultural environment, filtering light entering image sensors of each of the cameras with filters which selectively pass light in the frequency band utilized by the light projector, capturing an image of the scene with each of the cameras to obtain first and second camera images, and generating a depth map including a depth value corresponding to each pixel in the first camera image.

In some embodiments, the filters are band pass filters and the method further comprises blocking a majority of ambient light from entering the image sensors of each of the cameras with the band pass filters.

In some embodiments, the light projector emits violet light. The frequency band of light emitted from the light projector may be from 400 nm to 430 nm. Filtering the light entering the image sensors of each of the cameras may be performed with optical low pass filters.

In some embodiments, the light projector emits red light. The frequency band of light emitted from the light projector may be from 620 nm to 680 nm. Filtering the light entering the image sensors of each of the cameras may be performed with optical band pass filters.

In some embodiments, the light projector emits green light. The frequency band of light emitted from the light projector may be from 520 nm to 560 nm. Filtering the light entering the image sensors of each of the cameras may be performed with optical band pass filters.

In some embodiments, the non-uniform pattern is a non-uniform dot pattern generated by passing a laser emitted from the light projector through a diffractive optical element.

In some embodiments, the method further comprises characterizing the ambient light power spectrum in the indoor agricultural environment and selecting the frequency band based on the characterization.

In some embodiments, the method further comprises selecting the frequency band based on a form of illumination utilized for the plant in the indoor agricultural environment.

In some embodiments, the method further comprises polarizing light from the light projector at a selected polarization angle and filtering light entering image sensors of each of the cameras with filters which selectively pass light at the selected polarization angle.

In some embodiments, the method further comprises illuminating the scene with a non-patterned source of light in the frequency band.

In some embodiments, generating the depth map includes rectifying the first and second camera images so that a horizontal line drawn through both of the first and second camera images corresponds to a same epipolar line in real-world space.

In some embodiments, generating the depth map further includes performing depth measurement of each pixel in the camera images by matching a pixel in the first camera image with a corresponding pixel in the second camera image through searching along the epipolar line for candidate corresponding pixels, ranking each of the candidate corresponding pixels, and selecting the candidate corresponding pixel with a highest rank among the candidate corresponding pixels as the corresponding pixel. Generating the depth map may further include determining a distance of each pixel from the stereo pair of cameras from a separation distance between each pixel in the first camera image and its corresponding pixel in the second camera image.

In some embodiments, the method further comprises identifying a location of an item of agricultural produce in the depth map. The method may further comprise communicating the location of the item of agricultural produce to a robotic system configured to harvest the item of agricultural produce. The method may further comprise harvesting the item of agricultural produce with the robotic system.

In accordance with another aspect, there is provided a system for three-dimensional imaging of a plant in an indoor agricultural environment having an ambient light power spectrum that differs from a power spectrum of natural outdoor light. The system comprises a spatially separated stereo pair of cameras each including image sensors, filters placed in front of the image sensors of the cameras, the filters configured to block light having wavelengths with higher than average ambient intensities in the indoor agricultural environment, a light projector configured to project a non-uniform light pattern onto a scene including the plant, and a processor configured to generate a depth map of the scene from images captured by the stereo pair of cameras.

In some embodiments, the filters block a majority of ambient light in the indoor agricultural environment.

In some embodiments, the light projector emits violet light. The light projector may emit light in a frequency band of from 400 nm to 430 nm. The filters may be optical low pass filters.

In some embodiments, the light projector emits red light. The light projector may emit light in a frequency band of from 620 nm to 680 nm. The filters may be optical band pass filters.

In some embodiments, the light projector emits green light. The light projector may emit light in a frequency band of from 520 nm to 560 nm. The filters may be optical band pass filters.

In some embodiments, the system further comprises a light spectrum analyzer configured to characterize the ambient light power spectrum in the indoor agricultural environment and provide an indication of a bandwidth of light having a lower than average ambient intensity in the indoor agricultural environment.

In some embodiments, a frequency of light emitted by the light projector is selected based on a form of illumination utilized for the pant in the indoor agricultural environment.

In some embodiments, the light projector includes a laser emitter configured to emit a laser at a frequency which is substantially unattenuated by the filters, and a diffractive optical element in a light path of the laser configured to generate the non-uniform pattern as a non-uniform dot pattern.

In some embodiments, the light projector further includes a polarizer configured to polarize light projected from the light projector at a selected polarization angle, and the filters are configured selectively pass light at the selected polarization angle into the image sensors of the cameras.

In some embodiments, the system further comprises a second light projector configured to illuminate the scene with a non-patterned source of light in a frequency band selectively passed by the filters.

In some embodiments, the processor is further configured to identify a location of an item of agricultural produce in the depth map.

In some embodiments, the system further comprises a robotic harvester in communication with the processor and configured to harvest the item of agricultural produce.

In accordance with another aspect, there is provided a robotic harvester configured to harvest items of agricultural produce from positions identified by an embodiment of the system described above.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
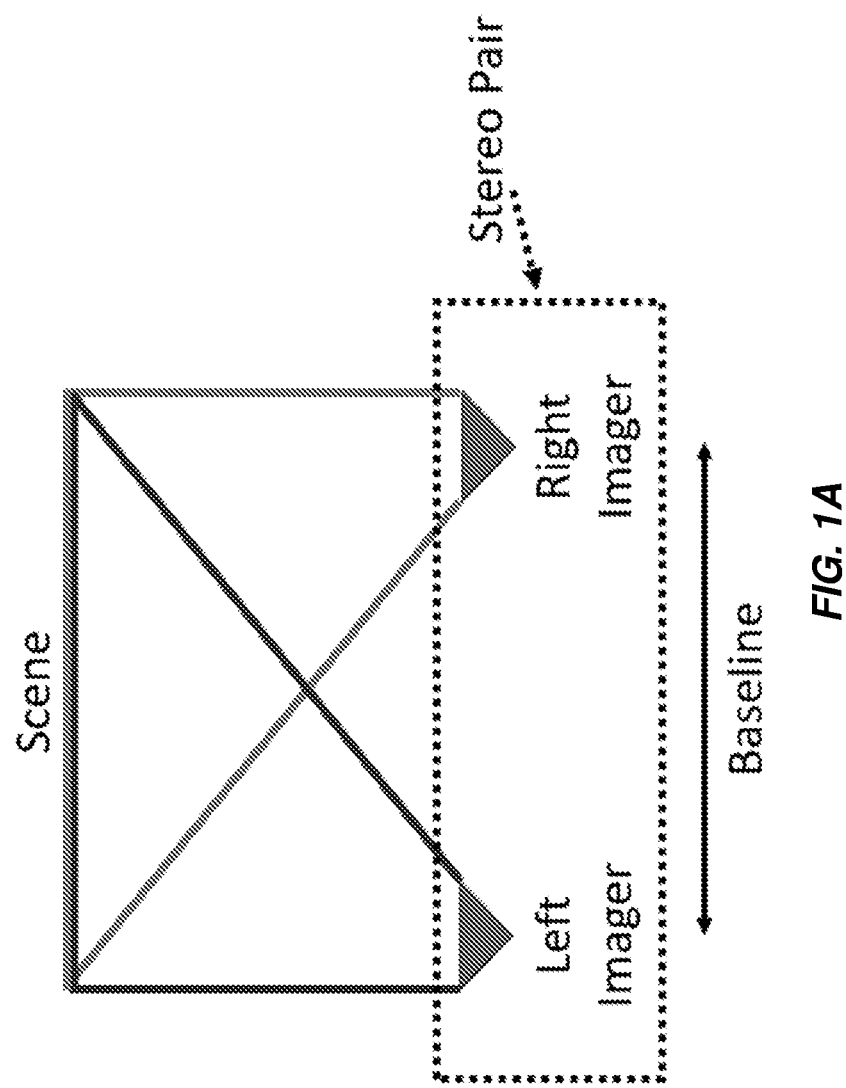
FIG. 1A illustrates an arrangement of image devices in a stereo imaging system.

Aspects and implementations disclosed herein are not limited to the details of construction and the arrangement of components set forth in the following description or illustrated in the drawings. Aspects and implementations disclosed herein are capable of being practiced or of being carried out in various ways.

3D Imaging as Applied to Robotics

Many robotic systems utilize mechanical manipulators and tools capable of moving through an environment to automatically manipulate target items in some way. Often, as is the case in widely applied industrial automation, the task is simple and highly constrained: a single type of item is moved from one position to another or operated on in some way with a high degree of repeatability as desired in many manufacturing processes. More recently however, robotics has been applied to increasingly complex tasks. For example, in the e-commerce industry robotic systems are being developed to handle disorganized items, even with thousands of varied items, to be placed into packaging for shipment. Humanoid robots are being researched which navigate hazardous and complex environments to perform everyday human tasks such as opening a door or container. Finally, several organizations have begun developing agricultural robotic systems which directly manipulate living crops to automate procedures such as seeding, propagation, de-leafing, trellising, and harvesting.

To plan and execute movements which avoid damaging collisions and optimize speed, the robotic system should be able to determine its location within the local environment and understand the extents of the local environment within which it can operate. These tasks are frequently referred to collectively as "navigation"—the combined competency to self-localize, map, and plan. Many techniques exist for synthesizing one or many sensor signals into locations within an a priori map or to construct a map. One sensor modality used in this process is range imaging. Range imaging refers to a collection of techniques which ultimately produce a 2D image in which each pixel or element in the image encodes the distance to a corresponding point in the environment from a reference point.

Advantages of Stereo Vision 3D Cameras

In some examples, robots tasked with producing a three-dimensional image of a scene may utilize stereo vision cameras.

While many range imaging sensor modalities have existed for some time (such as structured light, radar, LiDAR, time-of-flight, and interferometry) these tend to be either prohibitively expensive, limited in the types of surface or radiometric variations their measurements are robust to, or are incapable of providing complete range images in real time. The threshold for real time operation varies depending on the speed of relevant dynamics in the system but often falls within a fraction of a second for most robotic systems.

Specifically, LiDAR systems will typically have very high resolution and repeatability. Unfortunately, they are usually constructed with various mechanical moving parts which are prone to failure and make the instrument highly sensitive to mechanical vibration or shock. Time of flight sensors are also highly accurate, but due to the high speed required for light time of flight measurements (on the scale of tens of picoseconds per processor cycle), tend to have long minimum measurement distances. Both techniques suffer degraded accuracy or invalid data when surfaces have extreme reflectance or transmission properties. Many models also cannot achieve a sufficient signal-to-noise ratio in environments with a high degree of ambient near-infrared (NIR) illumination (such as outdoors). Consequently, versions of these sensors which have high spatial resolution, can operate under adverse lighting conditions, and can measure close minimum distances (less than a couple of meters) are exceedingly expensive (often several thousand dollars or more).

Fortunately, several new sensors which produce a range image in real time have become commercially available (for example the Intel® RealSense™ D415, the ASUS Xtion, the Occipital Structure, and the Stereolabs ZED cameras). Each utilizes a variation of stereo vision to extract distance information from one or more CCD or CMOS image sensors along with, in some examples, projected patterns of light to solve the correspondence problem and triangulate distance at each location within a 2D "depth map." Stereo vision has been studied as a depth imaging technique for many years but, until recently, the computational complexity associated with solving the correspondence problem (in which a region in one image is identified in the other to determine its disparity, also known as "stereo matching") was prohibitive and limited these sensors to either very low spatial resolutions or exceptionally slow speeds that don't meet real time requirements.

This limitation has been overcome by several developments. Improved algorithms solve the correspondence problem more accurately and with reduced computational resources. Readily available CCD and CMOS image sensors have become cheaper and high performing. Further, each of these new stereo-based sensors utilizes a proprietary application-specific integrated circuit or ASIC to perform stereo matching much more efficiently than generic processors could. Some of the above referenced sensor systems utilize two color image sensors with no added illumination (binocular stereo vision), some utilize one color sensor along with a precisely known and unique projected light pattern visible to the color sensor (a stereo vision variation known as structured light vision), and others combine both techniques. In many examples, these sensors fuse the 2D depth map or range image previously described with a 2D color image to create projected 3D point clouds where points are given accurate colors as measured in the color image. Cameras that do this are commonly referred to as RGB-D cameras (or "red green blue depth" cameras).

Binocular Stereo Matching and Dot Patterns

In some examples, the provision of light patterns on a scene to be imaged may facilitate three-dimensional imaging of the scene by a robot utilizing stereo vision cameras.

Figure 1B:
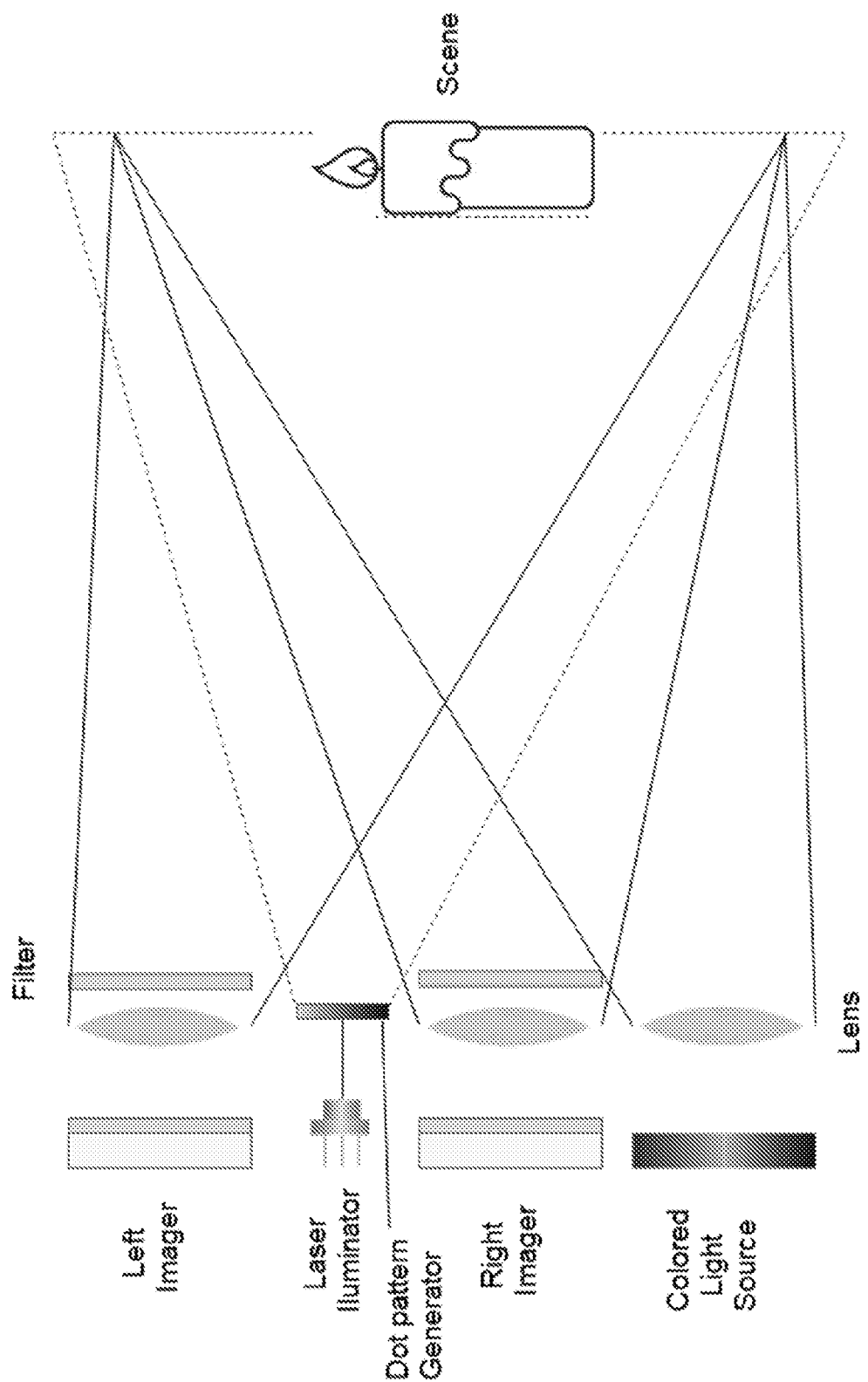
FIG. 1B illustrates an arrangement of image and illumination devices in another example of a stereo imaging system.

Binocular RGBD cameras typically rely on a process called binocular stereo matching to evaluate the depth of the scene for each given pixel. Binocular stereo matching works by pointing two cameras at the same scene with a small spatial separation in their baseline, as shown in FIGS. 1A and 1B. These two cameras together are referred to as a stereo pair. In various embodiments disclosed herein a binocular vision system may include not only two cameras, but also an illumination system, for example, a laser light illuminator that may generate laser light and direct the laser light through a dot pattern generator to generate a dot pattern on a scene to be imaged as described below, and/or a colored non-laser light source for further illuminating the scene as also further described below. Appropriate lenses and/or filters may be associated with the cameras and light sources as illustrated in FIG. 1B.

Figure 2:
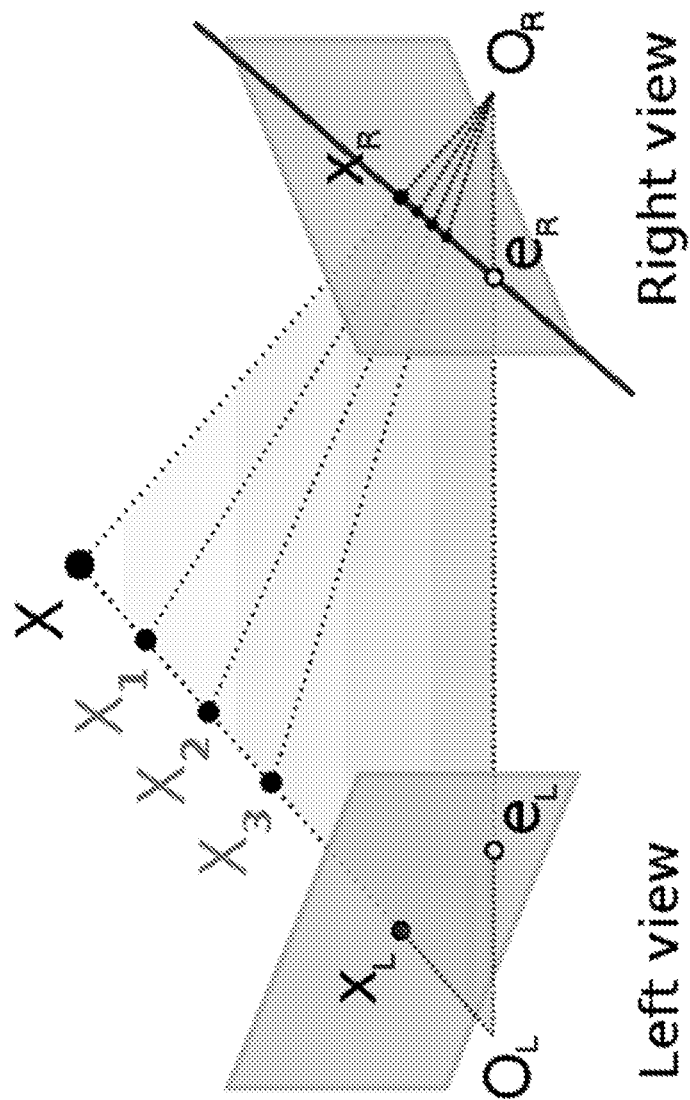
FIG. 2 illustrates how distance of a viewed object from a stereo vision imaging system may be determined.

The two captured images are rectified so that a horizontal line drawn through both images corresponds to the same epipolar line in real-world space. See FIG. 2.

Depth measurement is calculated at each pixel by matching a pixel in the left image to its corresponding pixel in the right image through searching along the epipolar line. A set of heuristics (such as for example L2 norm around an N×N pixel image window) is used to rank all candidate pixels, and the candidate that scores the highest is the corresponding matched pixel. The horizontal pixel separation distance between the two matched pixels is proportional to the distance of that pixel from the camera. The output of this process is called a depth map, generated with a depth value at each input pixel, or a null value for invalid or low confidence measurements. Matching criteria heuristics vary widely with different implementations, but typically include components of both RGB and luminance difference metrics.

During the pixel matching search, a scene with high variation from pixel to pixel increases the chances that a match can be found with high confidence, especially if each region of the image is unique. For instance, if a sensor was measuring a scene with a Christmas tree, the bright lights on the tree would stand out from the dark pine needle background, and so a match for the light pixel would have a much higher confidence score than all other candidate pixels. Conversely, in a textureless or low-contrast scene such as a flat wall, pixel matching is ambiguous because no set of heuristics can disambiguate between neighboring pixels. When this happens, depth measurement techniques applied to much or all that region of the scene returns inaccurate or invalid data.

Figure 3:
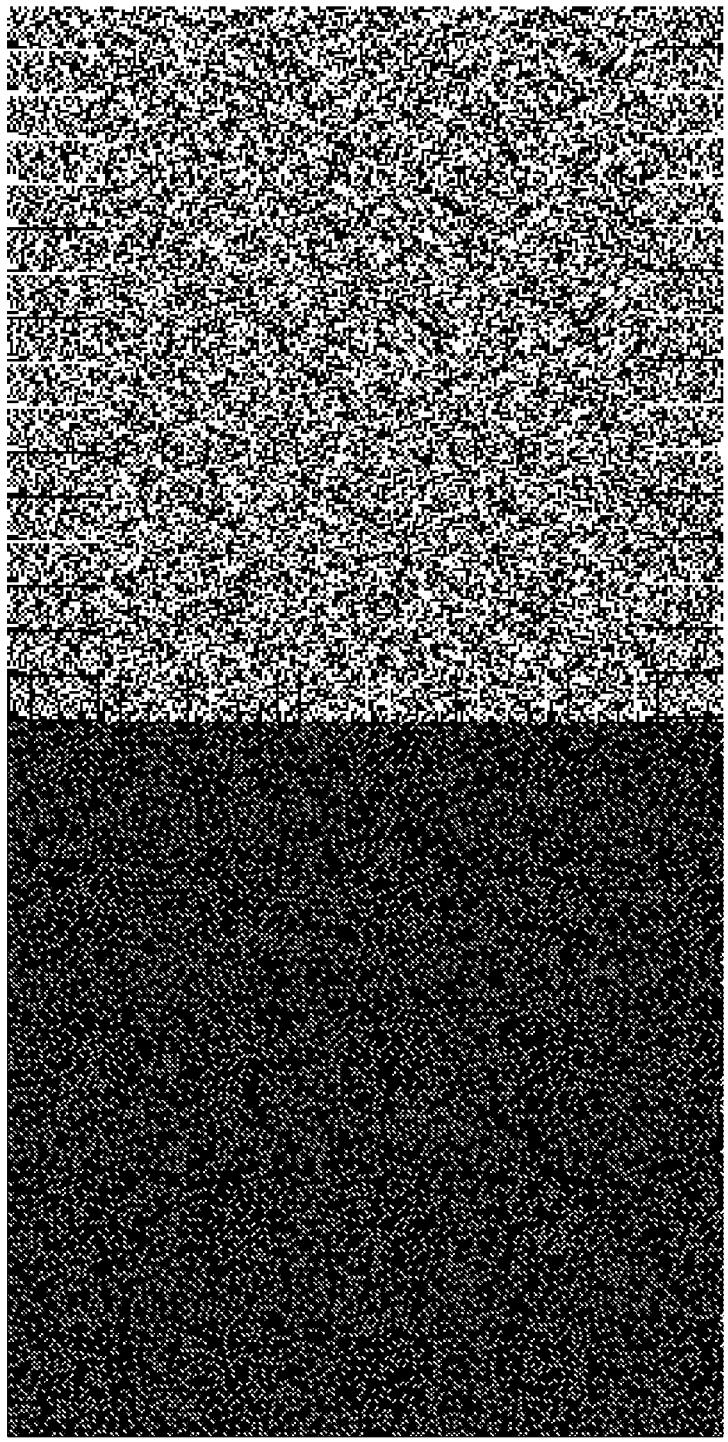
FIG. 3A illustrates a pattern that may be projected on a scene to facilitate determining the depths of features in the scene.
FIG. 3B illustrates another pattern that may be projected on a scene to facilitate determining the depths of features in the scene.

To overcome these issues and reduce the dependency of the sensor on the unique properties of the contents of a specific scene to produce reliable depth measurements, more recent cameras (such as the Intel® RealSense™ and Microsoft Kinect cameras) have employed an artificial dot pattern provided by a light projector. In some cases, the projector's pattern is designed in such a way that each sub region of it is guaranteed to be unique (as is the case of DeBruijn dot patterns, shown in FIG. 3B). When this type is used, stereo matching can be done with just one camera and the light projector, if the baseline between them and the globally unique pattern of the projector is known a priori (this is the method used by the Microsoft Kinect camera). In other examples, a randomized dot pattern, for example, as illustrated in FIG. 3A, is used which doesn't guarantee uniqueness but supplements the normal binocular (two camera) stereo matching process. The random dot pattern adds contrast and texture to surfaces in the scene and still tends to be mostly unique when examining a small local area of the image. This dramatically reduces matching ambiguity on surfaces that normally wouldn't have much inherent texture (e.g., flat or curved surfaces of uniform color).

The addition of a dot pattern projected onto the scene will make it more likely that the pixel window heuristics are matched correctly in the same image pair.

In practice, a properly projected and imaged dot pattern can mean the difference between a sensor that can resolve depth at every pixel, a sensor which cannot resolve any depth measurements at all, or one that provides measurements with high error rates that are not acceptable in robotic applications.

The practice of projecting a dot pattern to enhance stereo matching capabilities is now common in implementations of binocular stereo depth sensors and structured light vision sensors. However, these sensors are not designed or optimized with operation in vegetation rich indoor and outdoor agricultural environments in mind and suffer major performance degradation in those environments for reasons which will be further described below.

Operating Wavelengths for Binocular Stereo Depth Projectors

The effectiveness of three-dimensional imaging of a scene may be enhanced by utilizing wavelengths of light that are selected based on the background ambient light in a particular environment.

Near-infrared (NIR) radiation wavelengths (such as 800-960 nm) are commonly chosen in computer vision and binocular stereo mapping applications when projecting patterns of light onto the scene (as is the case for all the previously mentioned commercial stereo vision cameras). This is due to the moderate spectral sensitivity of many commercially available silicon CMOS imaging chips to NIR light, and the absence of NIR light in a typical industrial sensing environment such as a factory or office.

In an office or factory environment, lighting is primarily provided by fluorescent or LED sources. These sources are energy efficient, primarily because they only emit photons visible to human eyes, mostly between 400 and 700 nm wavelengths and centered at 555 nm to match the CIE luminosity curve used in measuring lumens.

Figure 4:
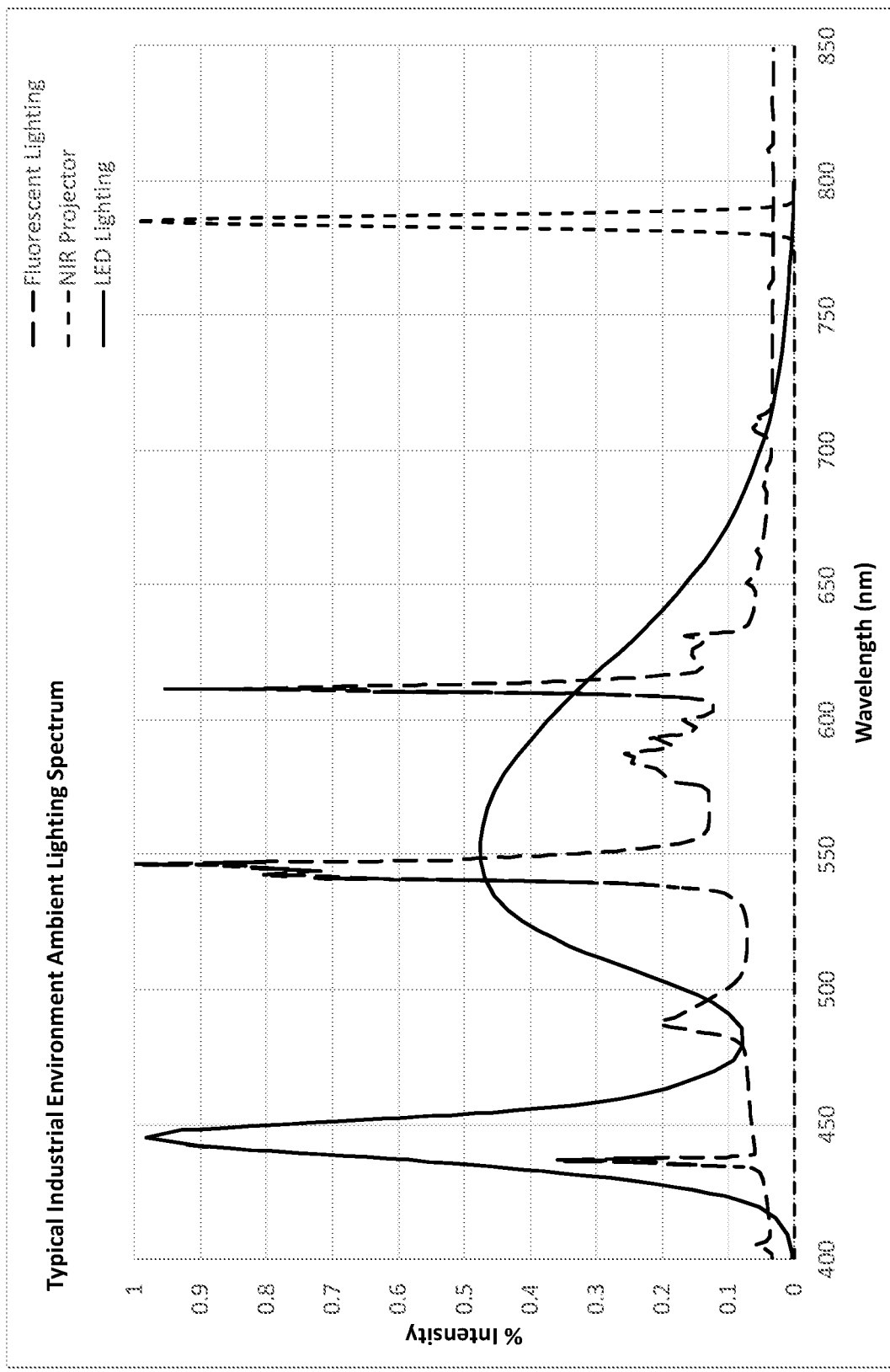
FIG. 4 illustrates the relative wavelengths of light used in some near-infrared imaging systems versus ambient light in a typical industrial environment.

In designing the emission wavelength of a laser or LED-based pattern projector for a binocular stereo depth camera, the sensor designer desires that the emitted and imaged pattern is not overcome or "washed out" by the ambient lighting conditions, as this would negate the benefit of projecting a pattern in the first place. Because these indoor environments do not have very much ambient lighting at wavelengths longer than 700 nm (See FIG. 4), and because the projection of a visible pattern could be undesirable if the sensor is being used on or around human users, typical off-the-shelf binocular stereo cameras are designed to operate in the near infrared (830-860 nm because of the common availability of inexpensive and high optical power laser light sources at these wavelengths). In addition, the typical spectral sensitivity of a silicon CMOS imaging sensor is much higher in this range (sometimes as high as 20-40% quantum efficiency) than at longer wavelengths. These factors all influence the sensor designer to prefer operating in near infrared, where common components are available and where ambient interference is lowest in the intended operating environment (a home, office, or warehouse).

Ambient Lighting in Highly Vegetative Agricultural Environments

Near-infrared illumination of a scene to facilitate three-dimensional imaging of the scene may not be an optimal choice in all environments. While 860 nm light projectors may be well suited to the home or office environment, they are a nearly worst-case selection for use in high vegetative indoor agricultural environments, such as a commercial greenhouse. They are also poorly suited to operating outdoors. This is because, in these challenging environments, very intense illumination in the NIR band from 750-1000 nm is present. Existing sensors leave these wavelengths unfiltered to view their projected patterns at 830-860 nm. As a result, in an agricultural setting, these sensors without modification will produce overexposed, low contrast image regions that retain little to no detail with which to perform stereo matching. Their projected patterns are washed out by ambient NIR light and provide little to no additional contrast in the image.

Figure 5:
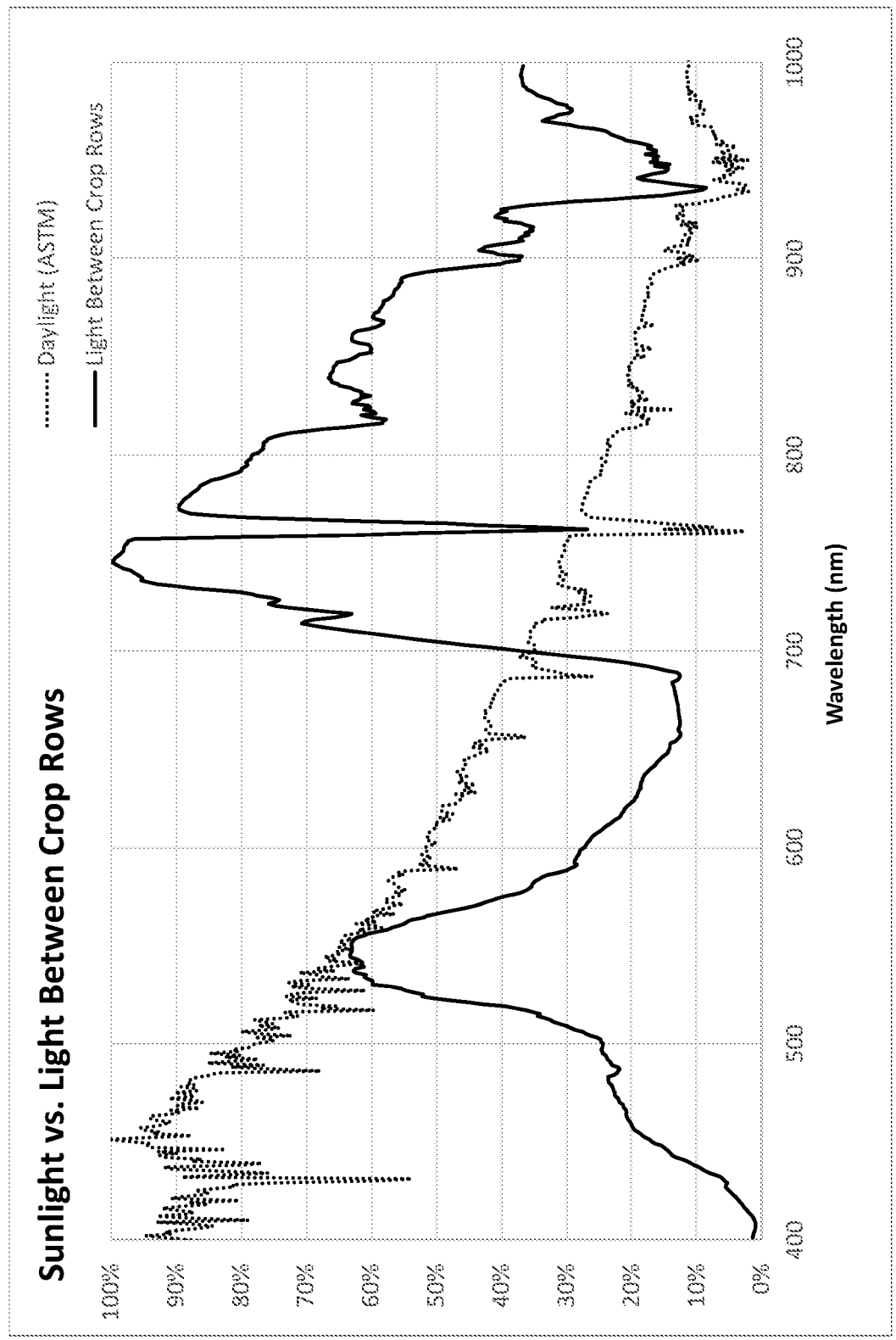
FIG. 5 illustrates the relative intensities of light at different wavelengths for sunlight and for an environment inside an example of a greenhouse.

To understand why so much NIR light contamination is present in typical indoor agricultural production environments, we must review how they are constructed along with the light absorbing properties of plants. Plastic or glass covered greenhouses, high tunnels, hoop houses (i.e., protected cultivation or "indoor farms") often strive to maximize the amount of light that the crops have access to. Most of these environments use natural sunlight to maximize yield and growth potential. While the covering glass or plastic in protected cultivation environments attenuates UV radiation, little IR light is blocked out. This is by design, as the retained IR light (due to the "greenhouse effect") provides additional heat within the covered growing environment, reducing or eliminating the need for supplemental heat in colder months. In addition, healthy plant vegetation is a moderately effective reflector of near infrared light (nearly 60% at 830-860 nm). When taken in combination, the transmissivity of the roof material and absorption spectrum of healthy vegetation results in an ambient normalized light spectrum that is expected to look like that shown in FIG. 5 (which is superimposed against a reference diffuse ASTM daylight spectrum of solar radiation at sea level).

Note that the key difference, compared to other lighting environments, is that so much NIR light intensity remains diffused in the vegetative environment that its spectral power is significantly higher than the visible spectrum. Hence traditional stereo vision sensors which are sensitive to NIR and utilize NIR light projectors are unable to operate effectively in these environments.

Tailoring Wavelength to Maximize Performance

The performance of imaging with light having wavelengths other than those falling in the near-infrared band may facilitate three-dimensional imaging of scenes in certain environments. To create a specialized stereo imaging sensor which excels in the previously described agricultural environments, disclosed herein are three novel examples of imaging system configurations. Each variation of the system includes two modified elements. First, a pair of CMOS camera sensors may be used as the stereo imaging pair in the same manner as previously constructed depth imaging sensors. However, filter media may be placed above each sensor which limits received wavelengths of light to a narrow and specific band of interest (a "band pass" filter media) or which blocks light above a certain wavelength (a "low-pass" filter media). Second, a light pattern projector is employed which casts its pattern onto the imaging scene.

In some embodiments, a narrow band pass filter above the CMOS stereo pair of camera sensors eliminates nearly all of the ambient illumination in the scene, and the light which forms the final image on each CMOS sensor comes predominantly from light reflected against surfaces in the scene which was emitted by the pattern projector. In this embodiment, a laser-based pattern projector may be used in which a laser light source is passed through a diffractive optical element to create the pattern of interest. Other light sources and optics could be used to achieve a similar effect (e.g., Gobo discs with non-coherent point light sources focused via external optical elements). Laser sources are advantageous (specifically, semiconductor solid state lasers)

because they consume very little electrical power and can be integrated into very small mechanical packages. Both attributes make them desirable for mobile battery powered robotic systems operating in a farm. In embodiments utilizing band pass filter media, the light source used may be selected to precisely match the band pass filter media placed above each CMOS sensor. The pattern to be projected may be a standard random or globally unique dot pattern like those previously described.

In each of the three configurations a different principal band of wavelengths is used for both the filtration media and the pattern projector light source. The use of these paired sensing and projection wavelengths is novel in stereo vision and each of the three principal bands is selected to provide a different set of advantages specific to indoor agricultural environments.

Example #1: 400-430 Nm Operating Band—Violet

Figure 6:
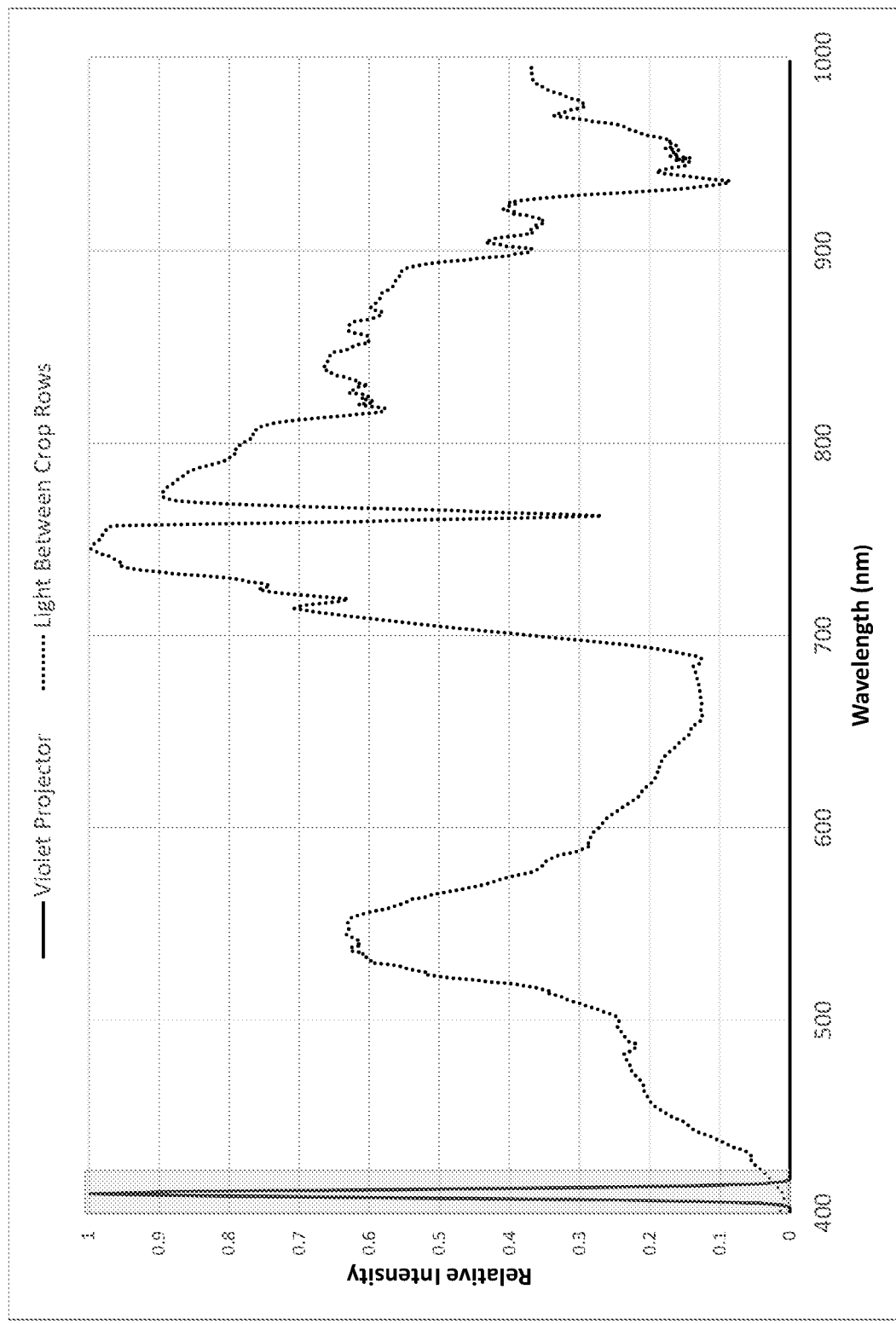
FIG. 6 illustrates the relative intensity of a violet light source as compared to ambient light within an example of a greenhouse at different frequencies.

For maximum immunity to ambient light in enclosed (greenhouse, hoop house, etc.) crop environments lit primarily by natural sunlight, visible violet sensing is particularly well suited, since most commercially used greenhouse covering materials block out the vast majority of the ambient UV radiation in sunlight. By selecting a deep blue to violet visible wavelength from 400-430 nm as the region of interest the depth sensor can be approximated to be operating in near total elimination of ambient light. (See FIG. 6.) Due to the low sensitivity of silicon (Si) CMOS sensors below 400 nm, an optical low pass filter with a 430 nm cutoff frequency could be used in place of a band pass filter to achieve the desired end result. The low pass wavelength should be designed as tightly as possible to the high end of the projector's emission spectral power distribution (SPD). In this case the sensor designer can be certain of the ability of the imaging sensors to read the projected dot pattern as reflected off the environment being measured.

For pattern projection a solid-state semiconductor laser diode at a matched wavelength may be used. Such diodes with center wavelengths in the range of 405-415 nm are widely and cheaply available even at high continuous wave (CW) power (thanks in particular to the proliferation of Blu-Ray disc reading and writing technology using 405 nm InGaN solid state laser diode chemistries). Since in this configuration virtually no ambient light is readable, a laser light source with as high an optical power as is feasible may be desired. Binocular stereo cameras can still operate very effectively and precisely in complete darkness relying exclusively on their projected pattern for texture that can be matched, but the brighter and higher contrast the texture pattern is the shorter the CMOS exposure durations used can be. Laser light from laser light sources passed through a diffractive optic may create very high contrast patterns. In this design the overall spectral power of the laser pattern projector should be high enough, that given the sensitivity of the particular CMOS sensors used in this configuration, exposure durations can still resolve scenes with a moderate amount of motion at real-time rates (this usually means exposure lengths in the tens of milliseconds or less are desired).

Some practical considerations make engineering a system to operate in this short of a wavelength band somewhat technically challenging. CMOS sensors can be selected which have moderate to high sensitivity in the visible violet 400-430 nm range (55-60% in the case of the recently released Sony IMX265 sensor, for example) but they are not particularly sensitive to UV radiation. It is difficult to source high CW power single-mode laser light sources and equally difficult to design and produce inexpensive diffractive optical elements which have a design wavelength in this range, low 0-order intensity, and a wide field of view. Diffractive optics which correct these problems are not yet widely commercially available. These design constraints can be overcome but may make this wavelength selection much more expensive to develop and produce than the other two which will be discussed as alternate embodiments.

Furthermore, vegetation absorbs 90-95% of the light in this bandwidth, meaning that there is an even higher requirement placed on the brightness of the light source to achieve a high contrast pattern that can be exposed at real-time speeds.

Example #2: 620-680 Nm Operating Band—Red

To facilitate the use of common off-the-shelf components and accelerate development and deployment, visible red sensing in the range of 620-680 nm is an attractive operating wavelength range due to the high absorption of this band of light by healthy vegetative material undergoing photosynthesis. In addition, standard CMOS sensors are available which are highly sensitive in this range (65-75% in the case of the Sony IMX365 sensor, for example). Similarly, laser light sources for use in integrating laser-based pattern projectors can be easily and inexpensively sourced with 100+ mW CW output power at these wavelengths (thanks to common InGaAlP solid state laser diode chemistry). Finally, low cost molded plastic diffractive optics can easily be produced at these design wavelengths with low 0-order intensity and wide field of view.

It would be desirable that the acceptance band of the bandpass filter media above each stereo CMOS image sensor window match the emission of the pattern projector light source as tightly as possible. For example, with a laser light source centered at 660 nm and a distribution matching a 2 nm full width at half maximum (FWHM), the bandpass filter would attenuate light below 656 nm and above 664 nm. This is not the only wavelength within the band that could be chosen but is one example for which off-the-shelf parts are commonly available. Alternatively, if not attainable at the full width half maximum the filter could match the full width 25% maximum of the light source emission spectrum. For example, for the described emitter at CWL 660 nm and FWHM 2 nm, the corresponding full width ¼ maximum would be approximately 5 nm. Therefore, the matching filter would attenuate light below 650 nm and above 660 nm.

Figure 7:
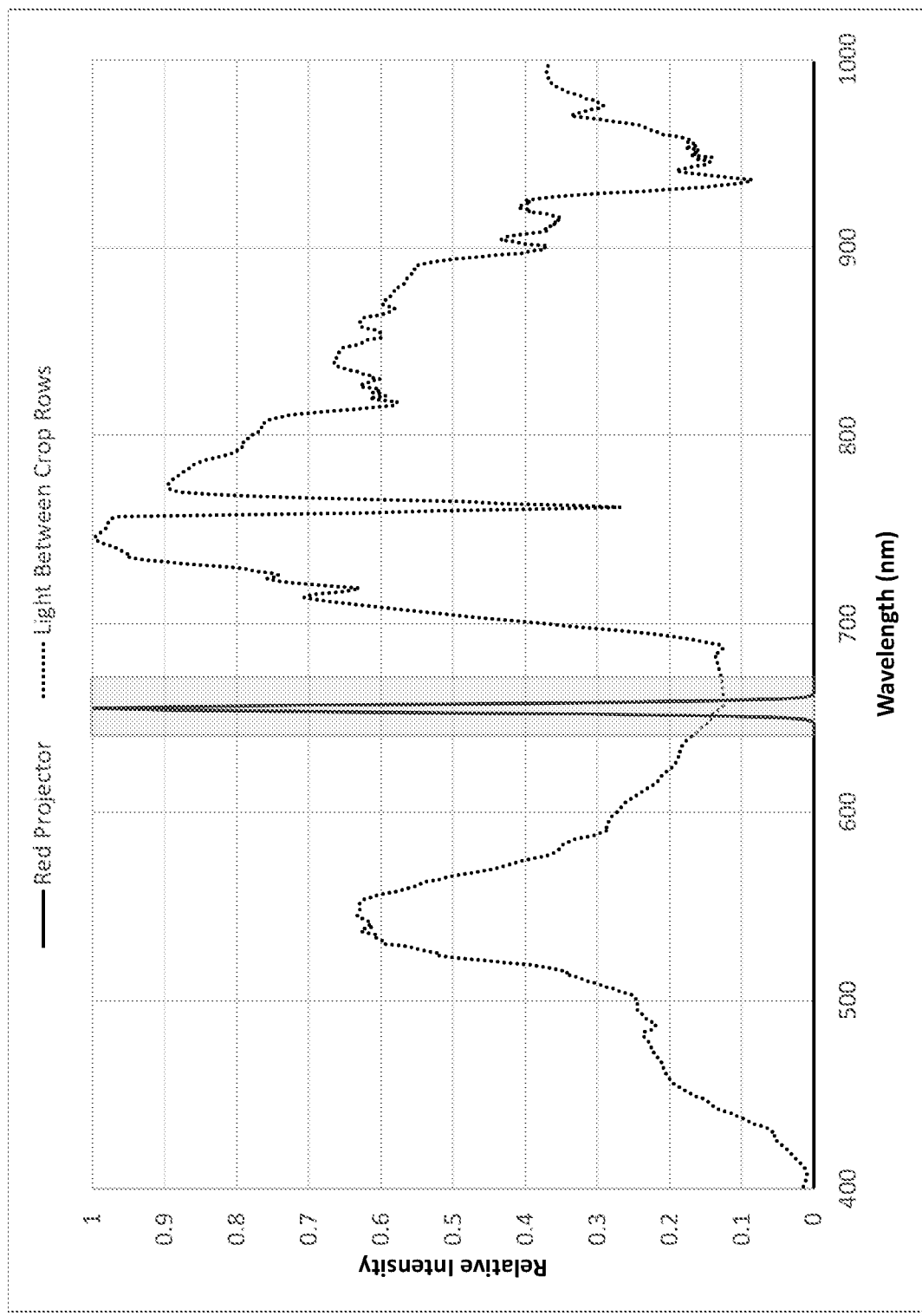
FIG. 7 illustrates the relative intensity of a red light source as compared to ambient light within an example of a greenhouse at different frequencies.

As in the previous embodiment, almost all ambient light is rejected from the scene, and only the high contrast projected pattern is used to perform stereo matching. However, in this embodiment, the parts used to construct the system are easier to fabricate and far less expensive. It is still the case that 85-90% of light in this bandwidth is absorbed by healthy vegetation but the combination of higher CMOS sensitivity, more powerful available light sources, more effective diffractive optics, and a higher but still small amount of available ambient light means it is substantially easier to construct a system which completes exposures and depth measurements in real time as compared to the previous embodiment which operates in visible violet. That said, there is significantly more ambient light contamination in this bandwidth (See FIG. 7), and so the accuracy and performance benefits of creating this isolation may not be as pronounced as they would be when operating in visible violet.

There is one exception to this limitation that is of special relevance to the application of this depth sensor embodiment. Many fruits and vegetables which mature or ripen by developing various carotenoids via bio-synthesis are highly reflective in this bandwidth. For example, both ripe and unripe tomatoes reflect nearly 95% of available light from 630-670 nm. This is generally true of other ripening fruits and vegetables, like bell peppers, which also gain their pigmentation from bio-synthetic production of β-carotene (orange fruits), lutein (yellow fruits), or lycopene (red fruits) as they ripen and mature. Because of this, operating in a bandwidth within visible red would provide excellent pattern contrast specifically on the surfaces of the fruits themselves, yielding higher quality and more precise depth measurements in those regions, regardless of fruit ripeness. This capability provides a tremendous advantage to robotic systems which will use the location data estimated from depth measurements to physically manipulate fruits growing on the plant.

Example #3: 520-560 Nm Operating Band—Green

In another contemplated embodiment, a visible green wavelength is used for the pattern projector and CMOS bandpass filter media. The range from 520-560 nm is of special interest for two reasons related specifically to the agricultural use case of the device. First, while significantly more ambient light is present at this wavelength under natural illumination (as previously discussed), many newer indoor agricultural facilities utilize artificial lighting which, to improve energy efficiency, emit almost exclusively in the visible blue and red using LED diodes. This is because these are the wavelengths which are predominantly absorbed and utilized in the process of photosynthesis.

In this embodiment, band pass filtration media are placed over each CMOS imaging sensor which match as nearly as possible the projector wavelength (as in other embodiments). Standard CMOS sensors are typically exceptionally sensitive to green light. Solid state 520 nm GaN laser diodes and 532 nm diode-pumped solid-state laser modules are commonly available at high output power and would both make appropriate choices for projector light source center wavelength.

Figure 8:
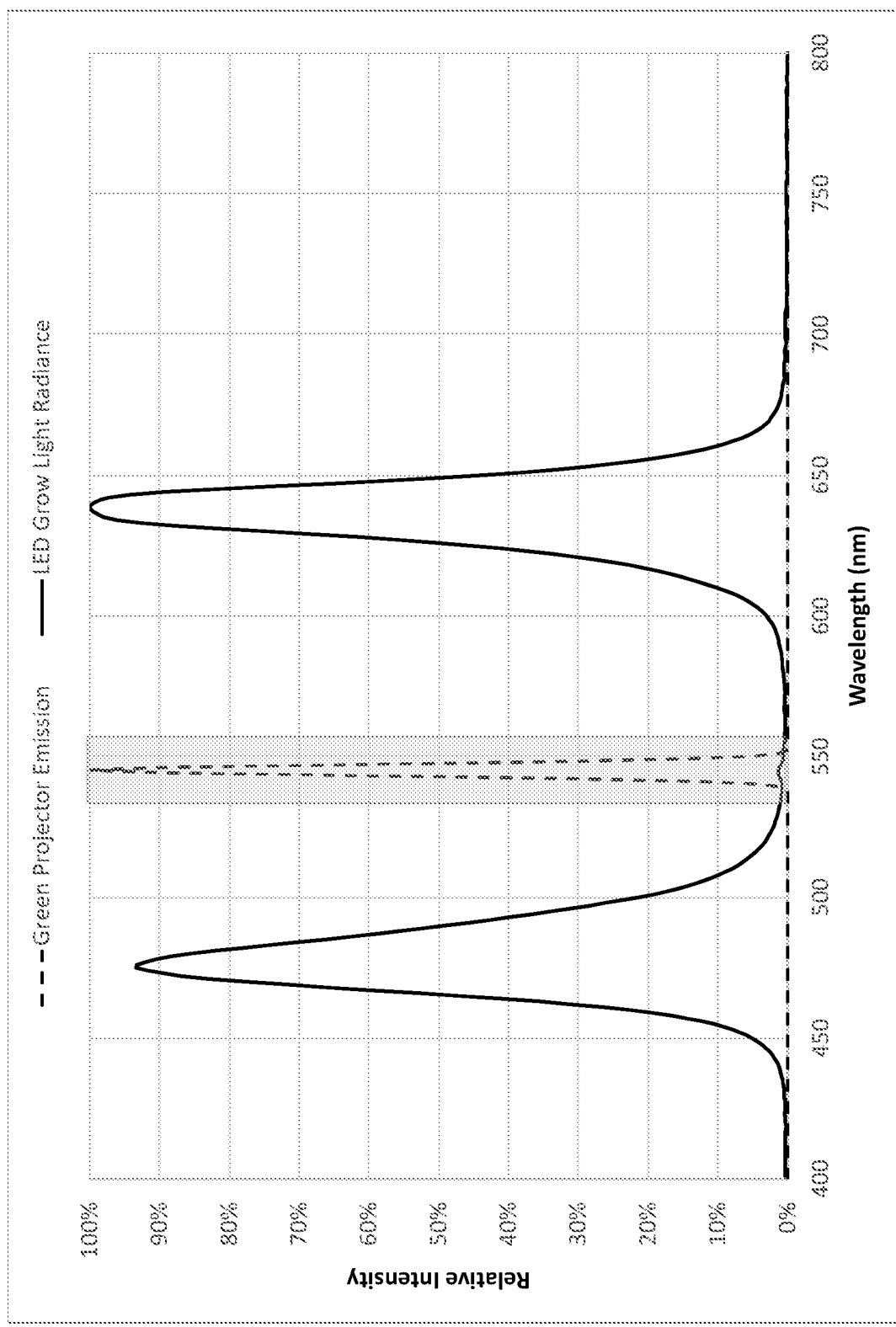
FIG. 8 illustrates the relative intensity of a green light source as compared to ambient light within an example of a greenhouse at different frequencies.

In the case of operating with artificial red-blue LED lighting, as is becoming common even in the greenhouse industry, both the violet and red operating wavelengths could be impacted negatively by the ambient lighting. Hence the visible green embodiment becomes preferable. As shown in FIG. 8, selecting an operating wavelength band centered on 532 nm provides excellent immunity in this type of illuminated environment.

Additionally, this wavelength still exhibits moderate reflectance on both leafy vegetation (approximately 20%) and on immature fruits (approximately 37% in the case of tomatoes as shown in the figure above). Higher reflectance means that, at any given projector brightness, the pattern perceived by the CMOS sensors will be of higher brightness and contrast, improving depth measurement quality, decreasing exposure durations, and lowering the cost of constituent hardware substantially.

Augmentation of Illumination within Operating Wavelength

Aside from selecting an appropriate wavelength of light with which to capture a three-dimensional image of a scene, other illumination parameters may be adjusted or provided to enhance the image quality.

Another useful physical property to promote rejection of environmental interference is polarization. Like the design of wavelength-based selective filters, if the pattern projection source is polarized at a known angle and the imaging system is also filtered to accept light polarized at the projector polarization angle, contrast of the depth pattern projector brightness to environmental interference can be further enhanced. This may make operating in the visible green more tractable and help to overcome the greater amount of ambient light present in a naturally illuminated scene.

Stereo matching benefits from any additional and unique detail present in the image exposure. It may be desirable in any of the above embodiments to artificially provide 'bulk' illumination at the design wavelength of the system using readily available high-power LED modules (high brightness singe diode modules which emit almost exclusive within a narrow wavelength band are available from various manufacturers such as Lumileds). In this way, diffuse and possible polarized illumination within the narrow wavelength band being used by the stereo sensor can be provided and allow the natural textures of the surfaces in the scene to be resolved in the CMOS sensor exposures (in addition to the projected light pattern). In many cases, the combined illumination would be beneficial and improve depth measurement completeness and accuracy. Also, the added light on the scene will further reduce the exposure durations needed to resolve and image, helping the overall stereo vision system operate at higher real time frame rates. Since all of the light added via "bulk" diffuse illumination falls within the bandpass range of the CMOS filter media, no energy is wasted producing light that will ultimately be filtered out by the system, an important criteria for a battery powered mobile robotic system.

Example System

Figure 9:
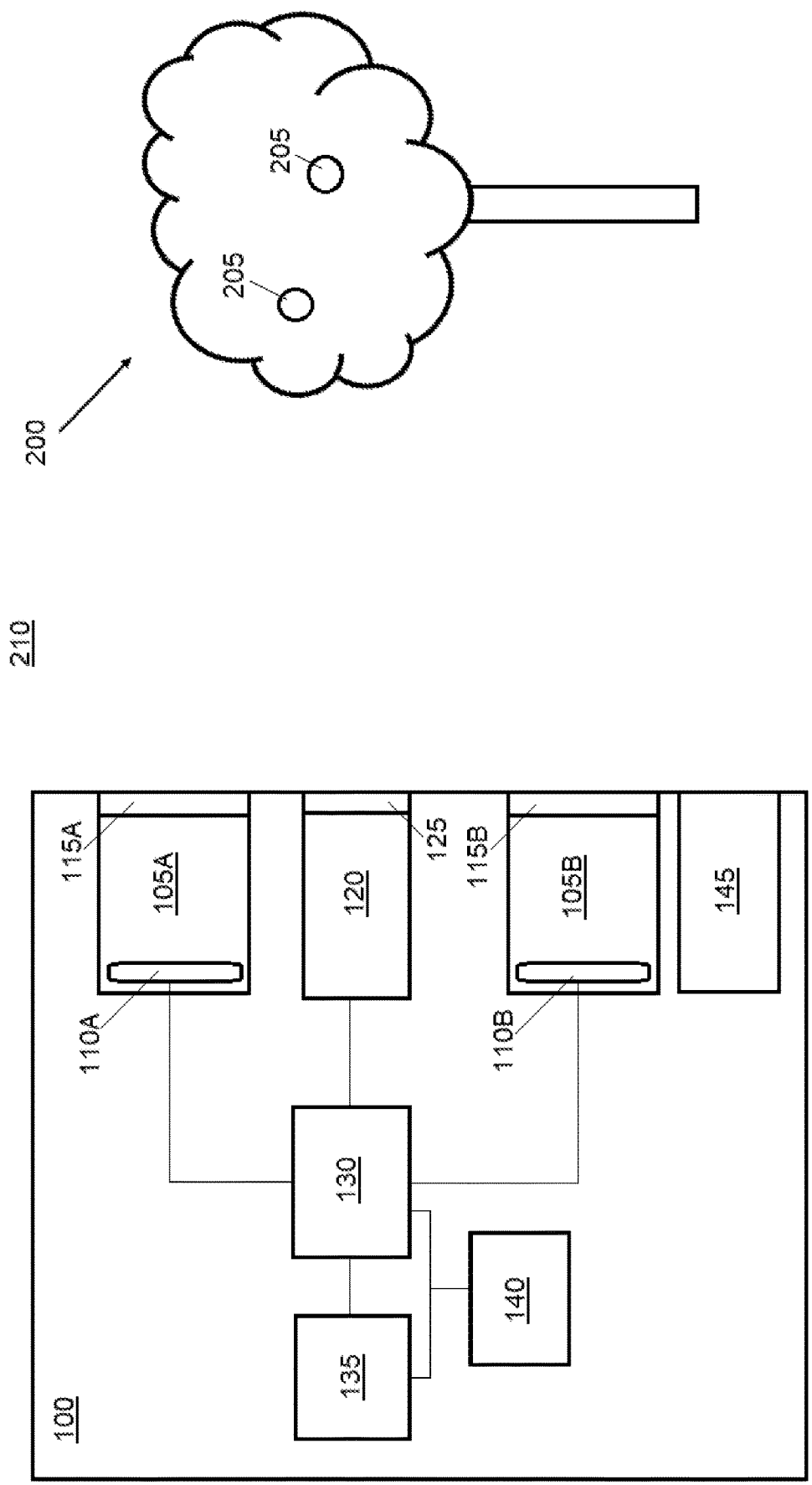
FIG. 9 illustrates an example of a system for three-dimensional imaging of a plant in an indoor agricultural environment.

An example of a system 100 for three-dimensional imaging of a plant 200 in an indoor agricultural environment 210 is schematically illustrated in FIG. 9. The system includes a spatially separated stereo pair of cameras 105A, 105B each including image sensors 110A, 110B. The cameras 105A, 105B may be physically separated or may be in the same body or package. The cameras 105A, 105B may be active stereo cameras with light projectors or, in other embodiments, may be passive stereo cameras without light projectors. Examples of commercially available cameras that may be utilized for the cameras 105A, 105B include the Intel® Realsense™ D415 or D435 cameras or the ZED Mini camera. The cameras 105A, 105B may exhibit a Root Mean Square Error (RMSE) for depth accuracy of about 3 mm or less, 2.5 mm or less, or 2 mm or less when imaging objects at a distance of 24 inches. The cameras 105A, 105B may exhibit a density, defined in pixels/mm$^2$ as the number of depth pixels that fall within an error tolerance of 2 mm per unit of imaged area when imaging objects at a distance of 24 inches.

Filters 115A, 115B are placed in front of the image sensors of the cameras 105A, 105B, or, in some embodiments, in front of the entireties of the cameras, for example, in front of the objective lenses of the cameras 105A, 105B. The filters 115A, 115B are configured to block light having wavelengths with higher than average ambient intensities in the indoor agricultural environment and/or to selectively pass light having a certain polarization. The system 100 further includes a light projector 120 configured to project a non-uniform, and in some embodiments, polarized, light pattern onto a scene including the plant. The light projector 120 may include or be in the form of a laser emitter configured to emit a laser at a frequency which is substantially unattenuated by the filters 115A, 115B, and a diffractive optical element 122 in a light path of the laser configured to generate the non-uniform pattern as a non-uniform dot pattern. The diffractive optical element 125 may include or be replaced by a polarizer configured to polarize light projected from the light projector 120 at the polarization angle that the filters 115A, 115B are configured to selectively pass light at. Accordingly, element 125 illustrated in FIG. 9 may represent a diffractive optical element and/or a polarizer. In some embodiments, the cameras 105A, 105B may be active stereo cameras that may include the light projector 120 within the same package or body as the other features of the cameras 105A, 105B.

The system also includes a processor 130 configured to generate a depth map of the scene from images captured by the stereo pair of cameras. The processor 130 may be operatively connected to a memory 135, for example, a disc drive or solid-state memory, for storing programming instructions or recorded images.

The system 100 also may include a light spectrum analyzer 140 configured to characterize the ambient light power spectrum in the indoor agricultural environment and provide an indication of a bandwidth of light having a lower than average ambient intensity in the indoor agricultural environment. The light spectrum analyzer 140 may be in communication with the processor 130 and/or memory 135 to receive instructions from or output results to.

A second light projector 145 may be included in the system 100 and be configured to illuminate a scene with a non-patterned source of light in a frequency band selectively passed by the filters 115A, 115B.

Figure 10:
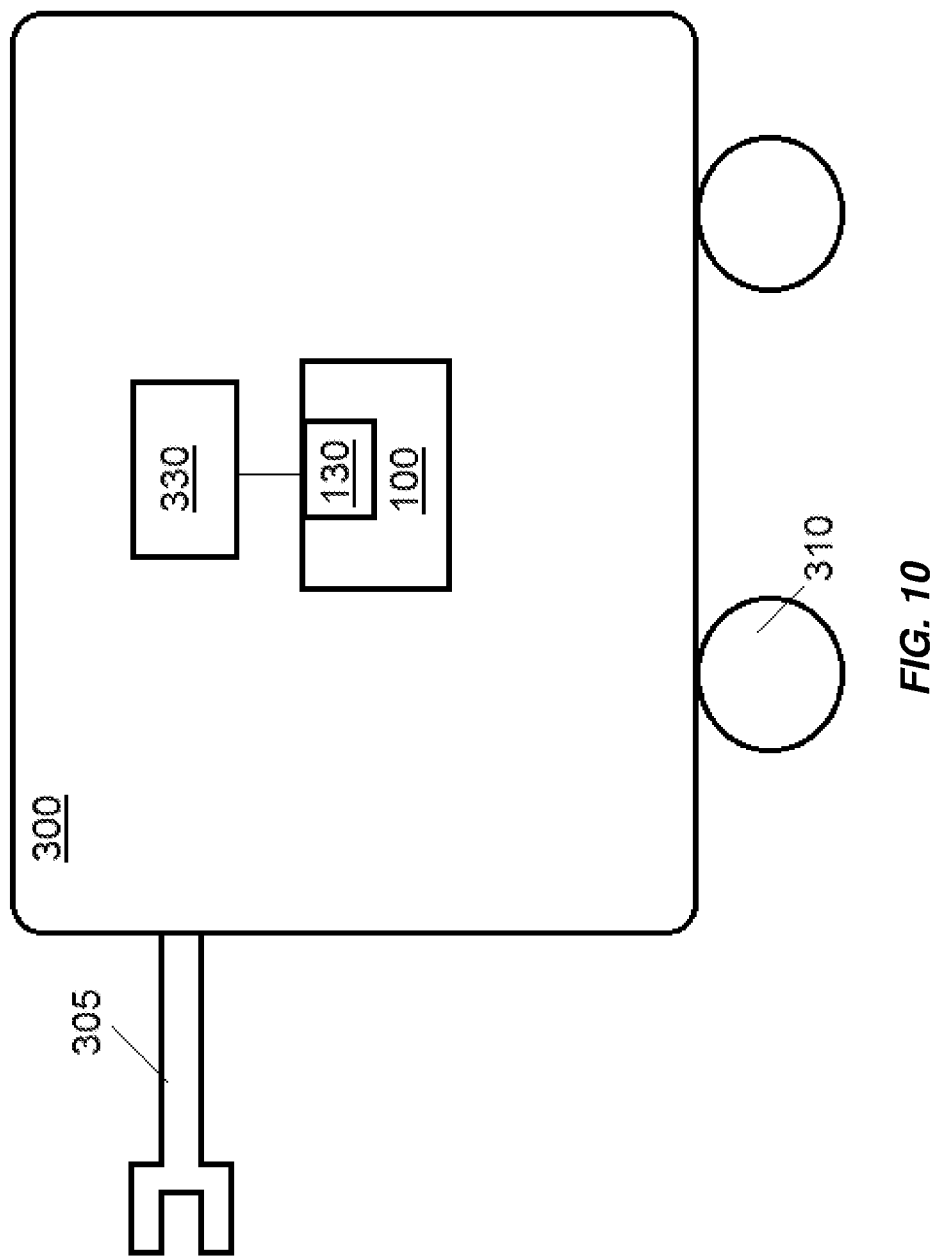
FIG. 10 illustrates an example of a robotic harvester.

The system 100 may be included in a robotic harvester 300, illustrated schematically in FIG. 10. The robotic harvester may include its own processor 330 in communication with the processor 130 of the system 100 or may be in communication with and operated by the processor 130. The harvester 300 may be configured to harvest items of agricultural produce 205 from positions identified by the system 100 using, for example, a robotic arm 305. The robotic harvester 300 may include wheels 310 or tracks or other forms of motive devices to move throughout an environment a harvest produce 205 from different plants 200 in the environment.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. The acts of methods disclosed herein may be performed in alternate orders than illustrated, and one or more acts may be omitted, substituted, or added. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for three-dimensional imaging a plant in an indoor agricultural environment having an ambient light power spectrum that differs from a power spectrum of natural outdoor light, the method comprising:
   directing a spatially separated stereo pair of cameras at a scene including the plant;
   illuminating the scene with a non-uniform pattern provided by a light projector utilizing light in a frequency band having a lower than average ambient intensity in the indoor agricultural environment;
   filtering light entering image sensors of each of the cameras with filters which selectively pass light in the frequency band utilized by the light projector;
   capturing an image of the scene with each of the cameras to obtain first and second camera images; and
   generating a depth map including a depth value corresponding to each pixel in the first camera image.

2. The method of claim 1, wherein the filters are band pass filters and the method further comprises blocking a majority of ambient light from entering the image sensors of each of the cameras with the band pass filters.

3. The method of claim 1, wherein the light projector emits violet light.

4. The method of claim 3, wherein the frequency band of light emitted from the light projector is from 400 nm to 430 nm.

5. The method of claim 3, wherein filtering the light entering the image sensors of each of the cameras is performed with optical low pass filters.

6. The method of claim 1, wherein the light projector emits red light.

7. The method of claim 6, wherein the frequency band of light emitted from the light projector is from 620 nm to 680 nm.

8. The method of claim 6, wherein filtering the light entering the image sensors of each of the cameras is performed with optical band pass filters.

9. The method of claim 1, wherein the light projector emits green light.

10. The method of claim 9, wherein the frequency band of light emitted from the light projector is from 520 nm to 560 nm.

11. The method of claim 9, wherein filtering the light entering the image sensors of each of the cameras is performed with optical band pass filters.

12. The method of claim 1, wherein the non-uniform pattern is a non-uniform dot pattern generated by passing a laser emitted from the light projector through a diffractive optical element.

13. The method of claim 1, further comprising characterizing the ambient light power spectrum in the indoor agricultural environment and selecting the frequency band based on the characterization.

14. The method of claim 1, further comprising selecting the frequency band based on a form of illumination utilized for the plant in the indoor agricultural environment.

15. The method of claim 1, further comprising polarizing light from the light projector at a selected polarization angle and filtering light entering image sensors of each of the cameras with filters which selectively pass light at the selected polarization angle.

16. The method of claim 1, further comprising illuminating the scene with a non-patterned source of light in the frequency band.

17. The method of claim 1, wherein generating the depth map includes rectifying the first and second camera images so that a horizontal line drawn through both of the first and second camera images corresponds to a same epipolar line in real-world space.

18. The method of claim 17, wherein generating the depth map further includes:
 performing depth measurement of each pixel in the camera images by matching a pixel in the first camera image with a corresponding pixel in the second camera image through:
  searching along the epipolar line for candidate corresponding pixels;
  ranking each of the candidate corresponding pixels; and
  selecting the candidate corresponding pixel with a highest rank among the candidate corresponding pixels as the corresponding pixel.

19. The method of claim 18, wherein generating the depth map further includes determining a distance of each pixel from the stereo pair of cameras from a separation distance between each pixel in the first camera image and its corresponding pixel in the second camera image.

20. The method of claim 1, further comprising identifying a location of an item of agricultural produce in the depth map.

21. The method of claim 20, further comprising communicating the location of the item of agricultural produce to a robotic system configured to harvest the item of agricultural produce.

22. The method of claim 21, further comprising harvesting the item of agricultural produce with the robotic system.

23. A system for three-dimensional imaging of a plant in an indoor agricultural environment having an ambient light power spectrum that differs from a power spectrum of natural outdoor light, the system comprising:
 a spatially separated stereo pair of cameras each including image sensors;
 filters placed in front of the image sensors of the cameras, the filters configured to block light having wavelengths with higher than average ambient intensities in the indoor agricultural environment;
 a light projector configured to project a non-uniform light pattern onto a scene including the plant; and
 a processor configured to generate a depth map of the scene from images captured by the stereo pair of cameras.

24. The system of claim 23, wherein the filters block a majority of ambient light in the indoor agricultural environment.

25. The system of claim 23, wherein the light projector emits violet light.

26. The system of claim 25, wherein the light projector emits light in a frequency band of from 400 nm to 430 nm.

27. The system of claim 25, wherein the filters are optical low pass filters.

28. The system of claim 23, wherein the light projector emits red light.

29. The system of claim 28, wherein the light projector emits light in a frequency band of from 620 nm to 680 nm.

30. The system of claim 28, wherein the filters are optical band pass filters.

31. The system of claim 23, wherein the light projector emits green light.

32. The system of claim 31, wherein the light projector emits light in a frequency band of from 520 nm to 560 nm.

33. The system of claim 31, wherein the filters are optical band pass filters.

34. The system of claim 23, further comprising a light spectrum analyzer configured to characterize the ambient light power spectrum in the indoor agricultural environment and provide an indication of a bandwidth of light having a lower than average ambient intensity in the indoor agricultural environment.

35. The system of claim 23, wherein a frequency of light emitted by the light projector is selected based on a form of illumination utilized for the pant in the indoor agricultural environment.

36. The system of claim 23, wherein the light projector includes a laser emitter configured to emit a laser at a frequency which is substantially unattenuated by the filters, and a diffractive optical element in a light path of the laser configured to generate the non-uniform pattern as a non-uniform dot pattern.

37. The system of claim 23, wherein the light projector further includes a polarizer configured to polarize light projected from the light projector at a selected polarization angle, and the filters are configured selectively pass light at the selected polarization angle into the image sensors of the cameras.

38. The system of claim 23, further comprising a second light projector configured to illuminate the scene with a non-patterned source of light in a frequency band selectively passed by the filters.

39. The system of claim 23, wherein the processor is further configured to identify a location of an item of agricultural produce in the depth map.

40. The system of claim 39, further comprising a robotic harvester in communication with the processor and configured to harvest the item of agricultural produce.

41. A robotic harvester configured to harvest items of agricultural produce from positions identified by the system of claim 23.

* * * * *